US009209681B2

(12) United States Patent
Chern et al.

(10) Patent No.: US 9,209,681 B2
(45) Date of Patent: Dec. 8, 2015

(54) CHARGE PUMP INITIALIZATION DEVICE, INTEGRATED CIRCUIT HAVING CHARGE PUMP INITIALIZATION DEVICE, AND METHOD OF OPERATION

(71) Applicant: TAIWAN SEMICONDUCTOR MANUFACTURING COMPANY, LTD., Hsinchu (TW)

(72) Inventors: Chan-Hong Chern, Palo Alto, CA (US); Chih-Chang Lin, San Jose, CA (US); Tsung-Ching Huang, Mountain View, CA (US); Ming-Chieh Huang, San Jose, CA (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 14/189,553

(22) Filed: Feb. 25, 2014

(65) Prior Publication Data
US 2015/0244258 A1 Aug. 27, 2015

(51) Int. Cl.
*G05F 1/10* (2006.01)
*H02M 3/07* (2006.01)
(52) U.S. Cl.
CPC ..................................... *H02M 3/07* (2013.01)
(58) Field of Classification Search
CPC ................................ H02M 3/07; H02M 3/073
USPC ........................................................ 327/536
See application file for complete search history.

(56) References Cited

U.S. PATENT DOCUMENTS

| 6,226,194 | B1 * | 5/2001 | Bayer et al. ...................... 363/60 |
| 7,271,642 | B2 * | 9/2007 | Chen et al. ...................... 327/514 |
| 8,040,174 | B2 | 10/2011 | Likhterov | |
| 8,300,489 | B2 * | 10/2012 | Fifield et al. ................... 365/226 |

FOREIGN PATENT DOCUMENTS

| TW | 201042656 | 12/2010 |
| TW | 201336212 | 2/2012 |

OTHER PUBLICATIONS

Office Action dated Oct. 15, 2015 from corresponding No. TW 103129144.

* cited by examiner

*Primary Examiner* — Jeffrey Zweizig
(74) *Attorney, Agent, or Firm* — Hauptman Ham, LLP

(57) ABSTRACT

In an initialization phase of a charge pump, an input signal is supplied to an input electrode of a capacitor of the charge pump and to an initialization device of the charge pump. An initialization signal is supplied to the initialization device of the charge pump. The initialization device supplies an output signal to an output electrode of the capacitor. The output signal has a high level and a low level corresponding to a high level and a low level of the input signal, the input signal and the output signal causing a charge to be accumulated in the capacitor. In a pumping operation phase following the initialization phase, the initialization signal is removed from the initialization device to place the output electrode of the capacitor in a floating state, and a pumping action is performed with the charge accumulated in the capacitor.

20 Claims, 9 Drawing Sheets

CHARGE PUMP INITIALIZATION DEVICE, INTEGRATED CIRCUIT HAVING CHARGE PUMP INITIALIZATION DEVICE, AND METHOD OF OPERATION

BACKGROUND

A charge pump is a converter that uses one or more capacitors as energy storage elements to change a signal level at an input of the charge pump to a different signal level at an output of the charge pump. As with other types of circuitry in integrated circuits (IC), processing speed, signal accuracy, die area, power consumption, reliability, and like factors are design considerations for charge pumps and related circuitry.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
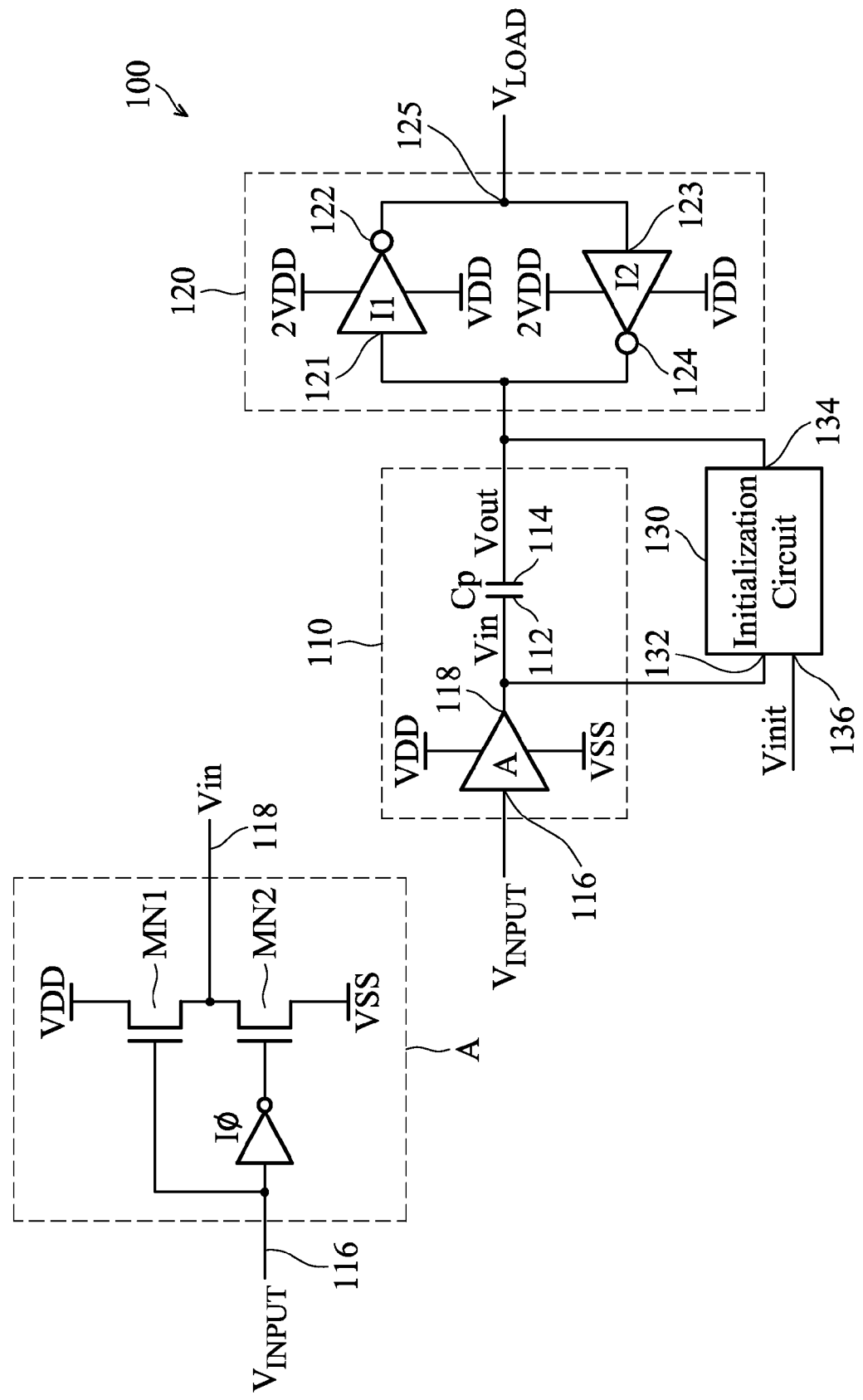
FIG. 1 is a schematic diagram of an integrated circuit having a charge pump initialization device, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram of an integrated circuit 100 in accordance with some embodiments. The integrated circuit 100 includes a charge pump 110, a latching circuit 120, and an initialization device 130.

The charge pump 110 includes a capacitor Cp configured to store a charge for a pumping action of the charge pump 110 as described herein. The capacitor Cp includes an input electrode 112 and an output electrode 114. The charge pump 110 further comprises an inverter, a buffer, or a source follower driver A. In at least one embodiment, the buffer includes an even number of inverters coupled in series. The source follower driver A includes an input 116 and an output 118. The output 118 is coupled to the input electrode 112 of the capacitor Cp. The source follower driver A is coupled to receive power supply in a first power domain. For example, the first power domain is defined by a power supply voltage VDD (hereinafter "VDD") and a ground voltage VSS (hereinafter "VSS"). In an example configuration shown in FIG. 1, the source follower driver A includes a pair of n-channel metal-oxide semiconductor (NMOS) transistors NM1, NM2, and an inverter I0. The NMOS transistor NM1 (hereinafter "MN1") has a drain coupled to receive VDD, a source coupled to the output 118, and a gate coupled to the input 116. The NMOS transistor NM2 (hereinafter "MN2") has a drain coupled to the output 118, a source coupled to receive VSS, and a gate coupled to the input 116 via the inverter I0. Other configurations of the source follower driver A are within the scope of various embodiments.

A signal VINPUT (hereinafter "VINPUT") is supplied to the input 116 of the source follower driver A. In a first half cycle when VINPUT is at a high level, MN2 is turned OFF whereas MN1 is turned ON to pull the output 118 up to VDD. In a second half cycle when VINPUT is at a low level, MN1 is turned OFF whereas MN2 is turned ON to pull the output 118 down to VSS. As a result, a voltage at the output 118, which is an input signal Vin (hereinafter "Vin") supplied to the input electrode 112 of the capacitor Cp, follows VINPUT while swinging between VDD and VSS. When the capacitor Cp has an initial charge Cp*ΔV stored therein, an output signal Vout (hereinafter "Vout") at the output electrode 114 of the capacitor Cp follows Vin (and hence VINPUT) while swinging between VDD+ΔV and VSS+ΔV. For example, when ΔV=VDD, Vout of the capacitor Cp follows Vin (and hence VINPUT) while swinging between 2VDD and VDD. The described configuration and operation of the charge pump 110 are examples. Other configurations and/or operations of the charge pump 110 are within the scope of various embodiments. For example, in at least one embodiment, the source follower driver A is omitted and VINPUT is supplied to the input electrode 112 as Vin.

In the described pumping action of the charge pump 110, the input signal Vin is pumped up from the first power domain between VSS and VDD to the output voltage VOUT in a second power domain between 2VDD and VDD. This positive pumping action is achieved by a positive initial charge Cp*ΔV in the capacitor Cp, i.e., by initially charging the output electrode 114 to a voltage higher than that of the input electrode 112. In some embodiments, a negative pumping action and a negative charge pump are achieved, by a negative initial charge Cp*ΔV in the capacitor Cp, i.e., by initially charging the output electrode 114 to a voltage lower than that of the input electrode 112. In the following description, example positive charge pumps in accordance with some embodiments are described in detail. Negative charge pumps are within the scope of various embodiments.

The latching circuit 120 includes cross-coupled inverters I1 and I2. The inverter I1 has an input 121 coupled to the output electrode 114 of the capacitor Cp to receive Vout. The inverter I1 further has an inverted output 122 coupled to an output 125 of the latching circuit 120. The inverter I2 has an input 123 coupled to the output 125 of the latching circuit 120, and an inverted output 124 coupled to the output electrode 114 of the capacitor Cp. The latching circuit 120 operates in the second power domain between 2VDD and VDD, and is configured to latch Vout which swings in the second power domain. A voltage VLOAD (hereinafter "VLOAD") at the output 125 of the latching circuit 120 is the logical inverse of Vout. For example, when Vout has a logic high level, e.g., at 2VDD, the VLOAD has a logic low level, e.g., at VDD, and when Vout has a logic low level, e.g., at VDD, VLOAD has a logic high level, e.g., at 2VDD. In some embodiments, VLOAD is supplied to other circuitry which functions as a load with respect to the charge pump 110. Without the latching circuit 120, there is a potential situation that the initial charge $Cp*\Delta V$ in the capacitor Cp is gradually lost due to one or more factors, such as current leakage. Such a potential situation is avoidable in some embodiments by the latching circuit 120. Other configurations of the latching circuit 120 are within the scope of various embodiments. In at least one embodiment, the latching circuit 120 is omitted.

The initial charge $Cp*\Delta V$ in the capacitor Cp defines the pumping action of the charge pump 110. If the initial charge $Cp*\Delta V$ is not set as intended, the pumping action and/or reliability of the charge pump 110 and/or the integrated circuit 100 is/are affected. For example, if the initial charge $Cp*\Delta V$ is set lower than an intended level, insufficient pumping action is likely. In a potential situation where the initial charge $Cp*\Delta V$ is zero, i.e., the output electrode 114 is not pre-charged to a higher voltage than input electrode 112, no pumping action is achievable. If the initial charge $Cp*\Delta V$ is set higher than an intended level, Electrical Over Stress (EOS) issues potentially occur. For example, when the output electrode 114 is over-charged to 2VDD when the input electrode 112 is at VSS (i.e., zero), an initial charge $Cp*\Delta V$ of 2VDD is set across the capacitor Cp. The initial charge $Cp*\Delta V$ of 2VDD potentially causes EOS issues in the capacitor Cp which, in some embodiments, includes a dielectric layer between the input electrode 112 and the output electrode 114, and configured to have a nominal voltage of or about VDD. In addition, when Vin has a high level of VDD, Vout reaches a high level of $VDD+\Delta V=3VDD$. Such a high voltage level potentially causes EOS issues in the circuitry coupled to receive Vout. For example, components of the latching circuit 120 are configured, in some embodiments, to operate at a nominal voltage of or about VDD. When subject to a high voltage level 3VDD of Vout, such components of the latching circuit 120 are likely to fail (i.e., break down) or suffer performance degradation. To avoid or minimize one or more of the described potential undesirable effects, the initialization device 130 is provided.

The initialization device 130 includes a signal input 132 coupled to the input electrode 112 of the capacitor Cp, a signal output 134 coupled to the output electrode 114 of the capacitor Cp, and an enabling input 136 configured to receive an initialization signal Vinit (hereinafter "Vinit"). The initialization device 130 is enabled by Vinit in an initialization phase of the charge pump 110, and receives, at the signal input 132, the input signal Vin supplied to the input electrode 112 of the capacitor Cp. Depending on a low or high level of Vin, the initialization device 130 supplies, via the signal output 134, an output signal Vout of a corresponding low or high level to the output electrode 114 of the capacitor Cp. As a result, an intended initial charge $Cp*\Delta V$ is accumulated in the capacitor Cp. For example, when the intended initial charge $Cp*\Delta V$ is VDD, the initialization device 130 sets the output electrode 114 at 2VDD in response to Vin at VDD, and the initialization device 130 sets the output electrode 114 at VDD in response to Vin at VSS. The intended initial charge $Cp*\Delta V$ of VDD is an example. Other voltage levels of the intended initial charge $Cp*\Delta V$ are within the scope of various embodiments.

In a pumping operation phase following the initialization phase, Vinit is removed and the initialization device 130 is disabled. As a result, the output electrode 114 is left in a floating state, and Vout at the output electrode 114 follows Vin at the input electrode 112 in a pumping action of the charge pump 110 using the intended initial charge $Cp*\Delta V$, as described herein. In some embodiments with the latching circuit 120 coupled to the output electrode 114, the voltage at the output electrode 114 is latched during both the initialization phase and the pumping operation phase. As a result, the intended initial charge $Cp*\Delta V$ is maintained for proper initialization and pumping action. Example configurations of the initialization device 130 in accordance with some embodiments is described below.

Figure 2:
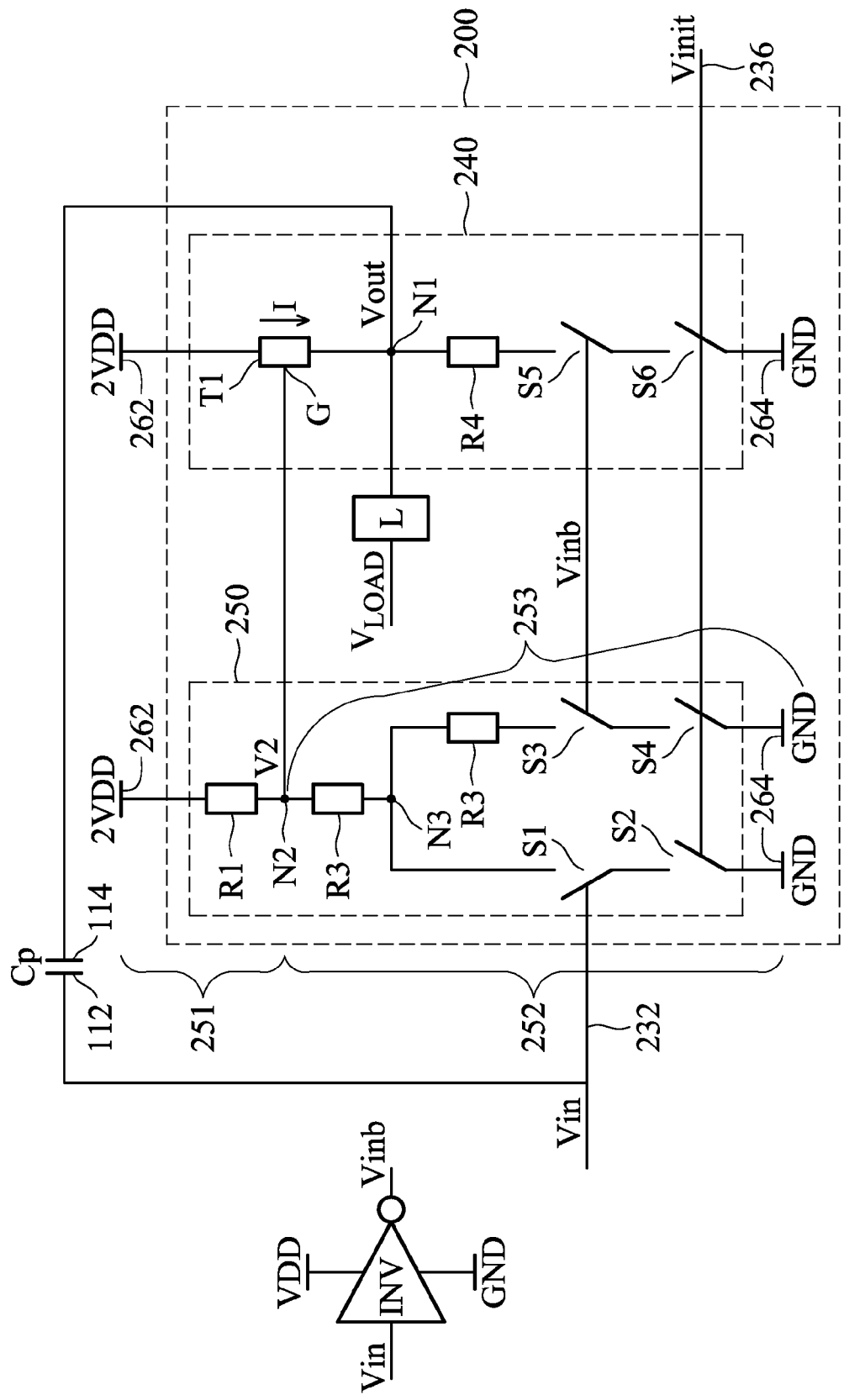
FIG. 2 is a schematic diagram of a charge pump initialization device, in accordance with some embodiments.

FIG. 2 is a schematic diagram of a charge pump initialization device 200 in accordance with some embodiments. In at least one embodiment, the initialization device 200 corresponds to the initialization device 130 described with respect to FIG. 1. The initialization device 200 includes a driving circuit 240 and a bias voltage circuit 250.

The driving circuit 240 is arranged between a first power supply node 262 and a second power supply node 264. The driving circuit 240 comprises a driver T1, a resistance circuit R4, a switch S5 and a switch S6 coupled in series in the recited order between the first power supply node 262 and the second power supply node 264. A first node N1 between the driver T1 and the resistance circuit R4 is configured to be coupled to the output electrode 114 of the capacitor Cp in a charge pump, as described with respect to FIG. 1. In at least one embodiment, the node N1 corresponds to the signal output 134 of the initialization device 130 as described with respect to FIG. 1. A latching circuit L is coupled to the node N1. In at least one embodiment, the latching circuit L corresponds to the latching circuit 120 as described with respect to FIG. 1. In at least one embodiment, the latching circuit L is omitted as described herein.

The bias voltage circuit 250 is arranged between the first power supply node 262 and the second power supply node 264. The bias voltage circuit 250 comprises a resistance circuit R1, a resistance circuit R2, a switch S1 and a switch S2 coupled in series in the recited order between the first power supply node 262 and the second power supply node 264. A second node N2 between the resistance circuit R1 and the resistance circuit R2 is coupled to a control terminal G of the driver T1. The bias voltage circuit 250 further comprises a resistance circuit R3, a switch S3 and a switch S4 coupled in series in the recited order between a third node N3 and the second power supply node 264. The node N3 is between the switch S1 and the resistance circuit R2. The resistance circuit R1 defines a first branch 251 between the first power supply node 262 and the node N2. The resistance circuit R2, switch S1 and switch S2 define a second branch 252 between the node N2 and the second power supply node 264. The resistance circuit R2, resistance circuit R3, switch S3 and switch S4 define a third branch 253 between the node N2 and the second power supply node 264. The second branch 252 and the third branch 253 share the resistance circuit R2, but have different resistances due to the resistance circuit R3 in the third branch 253.

In at least one embodiment, the driver T1 comprises a transistor, such as a p-channel metal-oxide semiconductor (PMOS) transistor. Other types of driver configured to perform the functionality described herein are within the scope of various embodiments. In at least one embodiment, at least one of the resistance circuits R1-R4 includes one or more resistors, and/or one or more diodes, and/or one or more diode-connected transistors. Other types of resistance circuits configured to perform the functionality described herein are within the scope of various embodiments. In at least one embodiment, at least one of the switches S1-S6 includes a transistor, such as an NMOS transistor or a PMOS transistor. Other types of switches configured to perform the functionality described herein are within the scope of various embodiments. In at least one embodiment, at least one pair of switches S1/S2, S3/S4 and S5/S6 is implemented by a single switch as described herein.

The initialization device 200 has a signal input 232 configured to receive an input signal Vin supplied to the input electrode 112 of the capacitor Cp. In at least one embodiment, the signal input 232 corresponds to the signal input 132 as described with respect to FIG. 1. Vin received at the signal input 232 is supplied to control the switch S1, switch S3 and switch S5. The switch S1 is configured to be closed (i.e., conductive) in response to a first level of Vin. For example, the first level of Vin is a high level. The switch S3 and switch S5 are configured to be closed (i.e., conductive) in response to a second level of Vin. For example, the second level of Vin is a low level. In the example configuration shown in FIG. 2, the second level of Vin is represented by an inverse signal Vinb (hereinafter "Vinb") which is an inverse of Vin. In at least one embodiment, Vinb is generated from Vin by an inverter INV. In at least one embodiment, the inverter INV is a part of the initialization device 200. In at least one embodiment, the inverter INV is outside the initialization device 200. In some embodiments, Vinb is omitted and Vin is supplied to the switch S3 and switch S5 which are of a different type of switch than the switch S1. For example, the switch S1 includes an NMOS transistor configured to be closed (i.e., conductive) in response to the first (high) level of Vin, whereas the switch S3 and switch S5 include PMOS transistors configured to be closed (i.e., conductive) in response to the second (low) level of Vin.

The initialization device 200 further has an enabling input 236 configured to receive an initialization signal Vinit. In at least one embodiment, the enabling input 236 corresponds to the enabling input 136 as described with respect to FIG. 1. Vinit received at the enabling input 236 is supplied to control the switch S2, switch S4 and switch S6. The switches S2, S4 and S6 are configured to be closed (i.e., conductive) in response to Vinit. For example, Vinit is a pulse of a high level. Other arrangements are within the scope of various embodiments.

In an initialization phase, Vinit is applied to the enabling input 236 of the initialization device 200. The switches S2, S4, S6 are closed in response to Vinit, the driving circuit 240 and the branches 251-253 of the bias voltage circuit 250 are enabled, and the initialization device 200 is enabled. The bias voltage circuit 250 is configured to output a bias voltage V2 (hereinafter "V2") to the control terminal G of the driving circuit 240 via the node N2. V2 has first and second levels corresponding to the first and second levels of Vin applied to the input electrode 112 of the capacitor Cp.

For example, when Vin is at the first level, e.g., the high level of VDD, the switch S1 is closed and the switch S3 and switch S5 are opened. The closed switch S1 and the closed switch S2 define a current path from the first power supply node 262, via the first branch 251, the second branch 252 to the second power supply node 264. The left part of the bias voltage circuit 250 functions as a voltage divider having a first voltage ratio defined by the resistances of the first branch 251 and the second branch 252. In an example configuration, a first power supply voltage at the first power supply node 262 is 2VDD, a second power supply voltage at the second power supply node 264 is the ground voltage GND (hereinafter "GND") or VSS, and the resistance of the first branch 251 defined by the resistance circuit R1 is about the same as the resistance of the second branch 252 defined by the resistance circuit R2. As a result, V2 has a first level of about VDD. The control terminal G of the driving circuit 240 is biased by the first level of V2. Because the switch S5 is opened, no current flows in the driving circuit 240. The control terminal G biased by the first level of V2 causes the driver T1 to pull Vout at the node N1 to 2VDD at the first power supply node 262. As a result, when the initialization device 200 is enabled by Vinit, Vout at the output electrode 114 is set to a high level (2VDD) corresponding to the high level (VDD) of Vin at the input electrode 112. An initial charge Cp*ΔV of VDD is set across the capacitor Cp.

When Vin is at the second level, e.g., the low level of GND (or VSS), the switch S1 is opened and the switch S3 and switch S5 are closed. The closed switch S3 and the closed switch S4 define a current path from the first power supply node 262, via the first branch 251, the third branch 253 to the second power supply node 264. The right part of the bias voltage circuit 250 functions as a voltage divider having a second voltage ratio defined by the resistances of the first branch 251 and the third branch 253. Because the resistance of the third branch 253 is greater than that of the second branch 252 due to the additional resistance circuit R3 not included in the second branch 252, the second voltage ratio is greater than the first voltage ratio and results in V2 having a second level greater than the first level of VDD. The control terminal G of the driving circuit 240 is biased by the second level of V2. Because the switch S5 is closed, a current path is established through the driving circuit 240. The control terminal G biased by the second level of V2 causes the driver T1 to generate a current I flowing in the driving circuit 240. The current I and the resistance of the resistance circuit R4 causes a voltage drop across the resistance circuit R4. The voltage drop defines the second level of Vout. In at least one embodiment, by selecting and/or adjusting at least one of the resistance of the resistance circuit R4 or the current I, Vout at the node N1 is set at an intended level. In at least one embodiment, the resistance of the resistance circuit R4 is selected and/or adjusted by selecting and/or adjusting the size and/or number of at least one resistor, diode or diode-connected transistor included in the resistance circuit R4. In at least one embodiment, the current I is selected and/or adjusted by selecting and/or adjusting at least one of the size of a transistor in the driver T1 or the voltage level of V2. In at least one embodiment, the voltage level of V2 is selected and/or adjusted by selecting and/or adjusting the size and/or the number of at least one resistor, diode or diode-connected transistor included in at least one of the resistance circuit R1, the resistance circuit R2 or the resistance circuit R3. In an example configuration, Vout is set at VDD. As a result, when the initialization device 200 is enabled by Vinit, Vout at the output electrode 114 is set to a low level (VDD) corresponding to the low level (GND) of Vin at the input electrode 112. An initial charge Cp*ΔV of VDD is set across the capacitor Cp.

In a subsequent pumping operation phase, Vinit is removed from the enabling input 236. The switches S2, S4, S6 are opened in the absence of Vinit, and the initialization device 200 is disabled. Because both the second branch 252 and the third branch 253 are opened circuits, no current flows in the bias voltage circuit 250, and V2 has a third level at or close to 2VDD. The control terminal G biased by the third level of V2 turns OFF the driver T1, and isolates the node N1 and the output electrode 114 connected thereto from the first power supply node 262. The opened switch S6 isolates the node N1 and the output electrode 114 connected thereto from the second power supply node 264. As a result, the node N1 and the output electrode 114 connected thereto are placed in a floating state. Vout at the output electrode 114 in the floating state follows Vin supplied to the input electrode 112 of the capacitor Cp in a pumping action as described herein. Because the intended initial charge Cp*ΔV has been correctly set in the initialization phase, the intended pumping action is achievable without one or more potential undesirable effects associated with incorrectly set initial charges. In at least one embodiment, all direct current (DC) paths through the initialization device 200 are shut off, e.g., by the opened switches S2, S4 and S6. As a result, power consumption and/or standby current of the disabled initialization device 200 is/are insignificant in one or more embodiments. In an example configuration, the standby current of the initialization device 200 in the disabled state is not greater than 1 μA (micro-amp).

Figure 3:
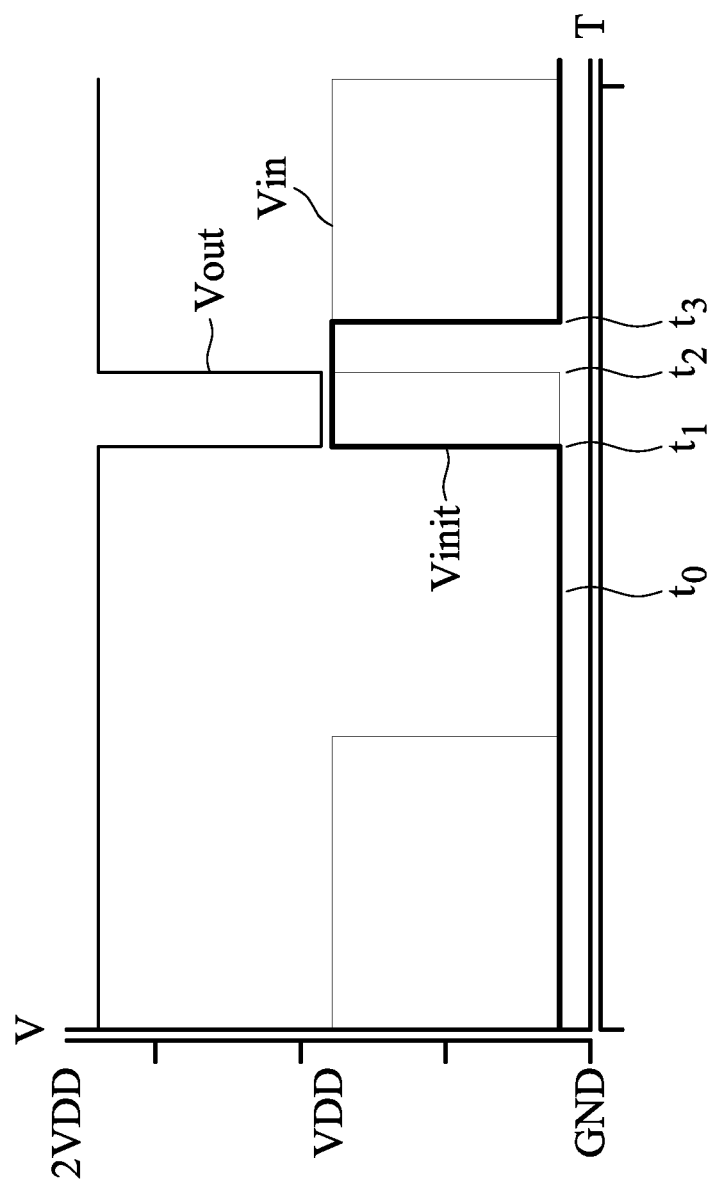
FIG. 3 is a timing diagram of an example operation of a charge pump initialization device, in accordance with some embodiments.

FIG. 3 is a time diagram showing an example operation of the initialization device 200 in the initialization phase. As shown in FIG. 3, at time t0 before the Vinit is supplied to the initialization device 200, Vout on the output electrode 114 is at 2VDD, Vin on the input electrode 112 is at GND, and a charge accumulated in the capacitor Cp is 2VDD which potentially causes Electrical Over-Stress (EOS) issues.

At time t1, Vinit is supplied to enable the initialization device 200 when Vin is at the low level of GND in the corresponding first power domain defined between VDD and GND. As described herein, the enabled initialization device 200, in response to the low level of Vin, sets Vout at the corresponding low level VDD in the corresponding second power domain defined between VDD and 2VDD. An intended initial charge Cp*ΔV of VDD is set across the capacitor Cp.

At time t2, while Vinit is still present, Vin transits from the low level of GND to the high level of VDD. As described herein, the enabled initialization device 200, in response to the high level of Vin in the corresponding first power domain, sets Vout at the corresponding high level 2VDD in the corresponding second power domain. The intended initial charge Cp*ΔV of VDD is maintained across the capacitor Cp.

At time t3, Vinit is removed to disable the initialization device 200. As described herein, the output electrode 114 of the capacitor Cp is placed in the floating state and retains the high level 2VDD of Vout set at the time t2. In the subsequent pumping operation phase, Vout of the floating output electrode 114 swings in the second power domain between VDD and 2VDD, while following the swinging of Vin at the input electrode 112 in the first power domain between GND and VDD. In some embodiments, Vinit is a signal in the first power domain, with a low level of GND when the initialization device 200 is disabled, and a high level of VDD when the initialization device 200 is enabled. In at least one embodiment, a duration of the high level of Vinit is shorter than half a cycle of Vin. In an example configuration, a duration of the high level of Vin ranges from 10 to 30 ps (picosecond). In at least one embodiment, such a short pulse of initialization signal is still sufficient to quickly and precisely set the intended initial charge Cp*ΔV in the capacitor Cp.

In some described embodiments, the bias voltage circuit 250 configured as a voltage divider is an example. Other bias voltage circuits configured to generate different bias voltage levels for biasing the driving circuit 240 are within the scope of various embodiments. In some described embodiments, the driving circuit 240 configured to pull Vout to the high level of 2VDD and to set a low level of Vout by a voltage drop across the resistance circuit R4 is an example. Other driving circuits configured to set the high level and low level of Vout in response to corresponding bias voltages from the bias voltage circuit 250 are within the scope of various embodiments.

Figure 4:
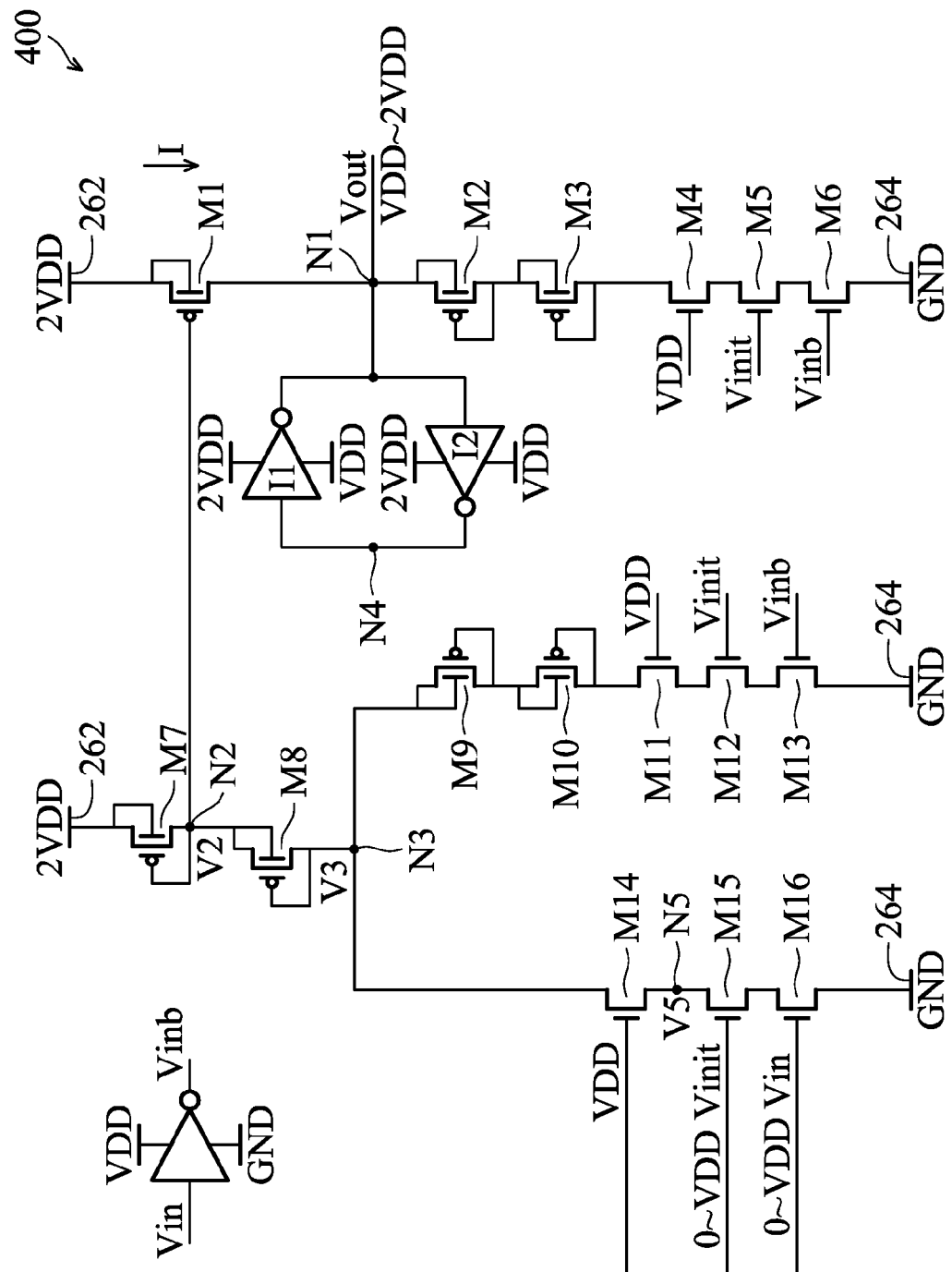
FIG. 4 is a circuit diagram of a charge pump initialization device, in accordance with some embodiments.

FIG. 4 is a circuit diagram of a charge pump initialization device 400 in accordance with some embodiments. The initialization device 400 includes a driving circuit defined by a PMOS transistor M1, a diode-connected transistor M2, a diode-connected transistor M3, an NMOS transistor M4, an NMOS transistor M5 and an NMOS transistor M6 coupled in series in the recited order between the first power supply node 262 and the second power supply node 264. In at least one embodiment, the transistor M1 corresponds to the driver T1, the diode-connected transistor M2 and diode-connected transistor M3 together define the resistance circuit R4, the transistor M5 corresponds to the switch S6 and the transistor M6 corresponds to the switch S5. The transistor M4 defines a cascode device with a gate thereof coupled to VDD. Inverters I1 and I2 are cross-coupled to define a latching circuit which is coupled to a node N1 to latch the voltage level of Vout at the node N1. The node N1 is between the transistor M1 and the diode-connected transistor M2. A node N4 of the latching circuit stores a logic inverse of the voltage level of Vout at the node N1, as described with respect to FIG. 1.

The initialization device 400 further includes a bias voltage circuit defined by a diode-connected transistor M7, a diode-connected transistor M8, a diode-connected transistor M9, a diode-connected transistor M10, an NMOS transistor M11, an NMOS transistor M12 and an NMOS transistor M13 coupled in series in the recited order between the first power supply node 262 and the second power supply node 264. The bias voltage circuit of the initialization device 400 further includes an NMOS transistor M14, an NMOS transistor M15 and an NMOS transistor M16 coupled in series in the recited order between a node N3 and the second power supply node 264. The node N3 is between the diode-connected transistor M8 and the diode-connected transistor M9. A node N2 between the diode-connected transistor M7 and the diode-connected transistor M8 is coupled to the gate of the transistor M1. In at least one embodiment, the diode-connected transistor M7 corresponds to the resistance circuit R1, the diode-connected transistor M8 corresponds to the resistance circuit R2, the diode-connected transistors M9 and M10 together define the resistance circuit R3, the transistor M12 corresponds to the switch S4, the transistor M13 corresponds to the switch S3, the transistor M15 corresponds to the switch S2 and the transistor M16 corresponds to the switch S1. The transistor M11 and the transistor M14 define cascode devices with gates thereof coupled to VDD. The NMOS and NMOS transistors are examples. Other types of transistors are within the scope of various embodiments.

In some embodiments, the operation of the initialization device 400 is similar to the operation of the initialization device 200 and is not repeated herein.

In some embodiments, the presence of the cascode devices M4, M11 and M14 ensure that EOS issues are avoidable when the initialization device 400 is in a disabled state. For example, when the initialization device 400 is in the disabled state, the transistors M5, M12 and M15 are turned OFF (i.e., non-conductive) in response to the absence of the Vinit. As a result, no current flows in the bias voltage circuit of the initialization device 400, and a voltage V3 (hereinafter "V3") at the node N3 increases and becomes close to 2VDD due to the conductive states of the diode-connected transistors M7 and M8. Without the cascode device M14, the drain of the transistor M15 at a node N5 is pulled up to the high voltage level of V3, and eventually becomes close to 2VDD. Because the gate of the transistor M15 is at GND (zero) due to the absence of Vinit, a gate-drain voltage across the transistor M15 becomes close to 2VDD which potentially causes EOS issues, especially in situations where the transistor M15 is configured to have a nominal tolerable voltage of or about VDD.

The presence of the cascode device M14 between the node N3 and the transistor M15 prevents such a high gate-drain voltage across the transistor M15 in at least one embodiment. Specifically, VDD is supplied to the gate of the cascode device M14. As a result, a voltage V5 (hereinafter "V5") on the node N5 at the source of the cascode device M14 does not go beyond VDD, because if V5 reaches VDD, the gate-source voltage of the cascode device M14 becomes zero and turns OFF the cascode device M14, isolates the node N5 from the high voltage level (close to 2VDD) of V3, and prevents further rising of V5. Because V5 does not go beyond VDD, the gate-source and gate-drain voltages of the transistors M15 and M16 do not go beyond VDD, preventing EOS issues from occurring on the transistors M15 and M16. The cascode device M14 itself is free of EOS issues, because VDD on the gate of the cascode device M14 keep the gate-drain voltage across the cascode device M14 at about VDD, despite the high voltage level (close to 2VDD) of V3. The cascode devices M11 and M4 protect the corresponding transistors M12, M13 and transistors M5, M6 from potential EOS issues in similar manners.

In some embodiments, the initialization device 400 includes only core devices, i.e., all the transistors M1-M16 are core devices. Core devices in an integrated circuit are the devices having the thinnest gate dielectric layer, fastest speed and lowest nominal voltage. In at least one embodiment, because the initialization device 400 includes only core devices, a high speed initialization device is obtained which permits the initialization phase to be completed quickly. In at least one embodiment, the initialization device 400 and the associated charge pump are configured to include only core devices which have gate dielectrics of the same type and thickness. As a result, the manufacturing process is simplified with reduced cost and increased yield, compared to other approaches where devices of different gate dielectric thicknesses are used in charge pump circuitry. Nominal voltages of core devices depend on the technology nodes used to form the core device. For example, core devices formed by 28 nm technology have a nominal voltage of about 0.9 V, whereas core devices formed by 16 nm technology have a nominal voltage of about 0.8 V. EOS concerns related to the low nominal voltage of core devices in the initialization device 400 are addressed in some embodiments, as described herein. The low nominal voltage of the core devices in the initialization device 400 reduces power consumption.

Figure 5:
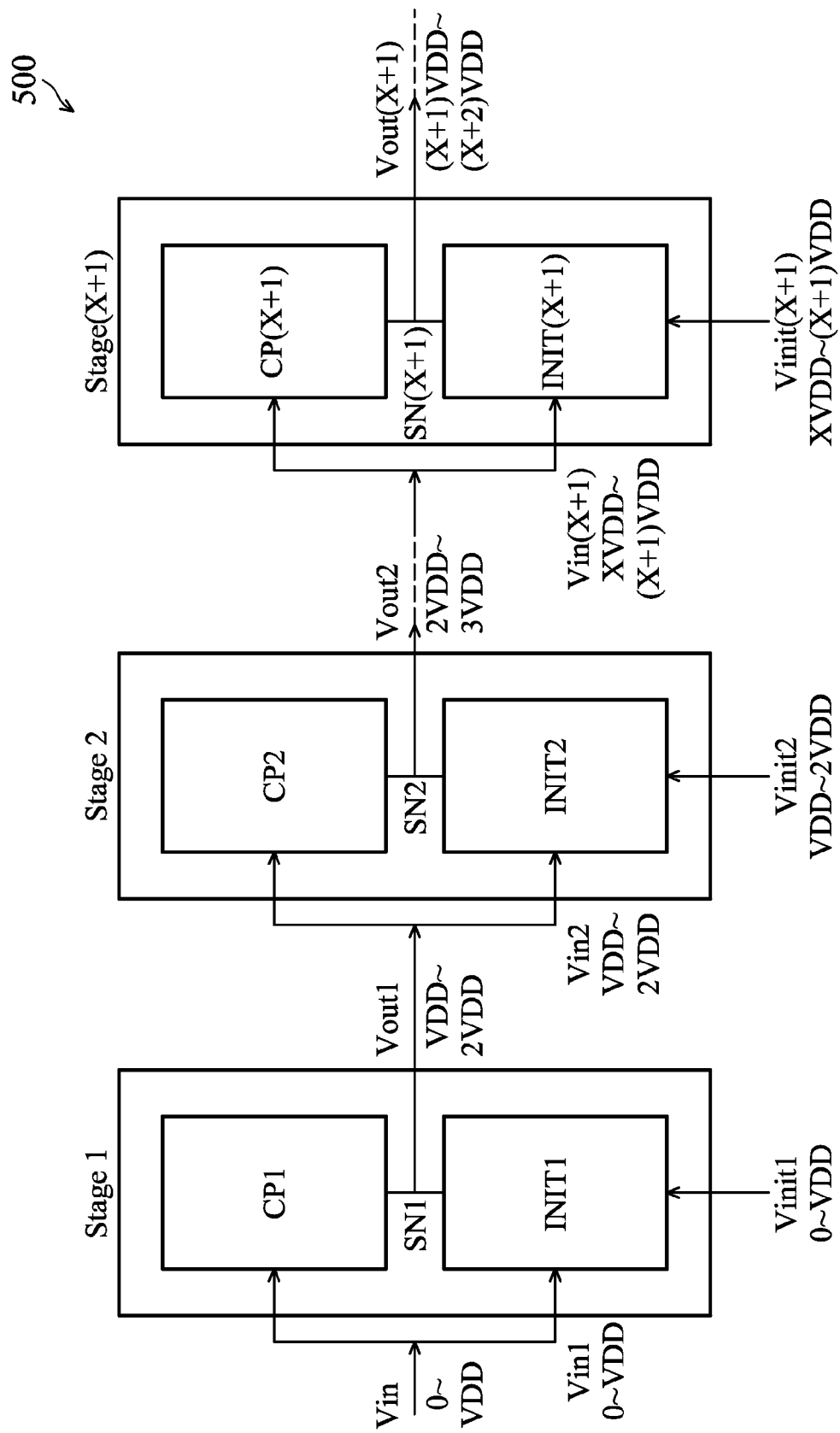
FIG. 5 is a schematic diagram of an integrated circuit having a plurality of charge pump stages, in accordance with some embodiments.

FIG. 5 is a schematic diagram of an integrated circuit 500 in accordance with some embodiments. The integrated circuit 500 having a plurality of charge pump stages, Stage 1, Stage 2, . . . Stage (X+1) . . . coupled in series. Each charge pump stage includes a charge pump and an associated initialization device. For example, the Stage 1 includes a charge pump CP1 and an initialization device INIT1, the Stage 2 includes a charge pump CP2 and an initialization device INIT2, . . . and the Stage (X+1) includes a charge pump CP(X+1) and an initialization device INIT(X+1). Each initialization device is configured to receive a corresponding initialization signal. For example, the initialization device INIT1 is configured to receive an initialization signal Vinit1, the initialization device INIT2 is configured to receive an initialization signal Vinit2, and the initialization device INIT(X+1) is configured to receive a initialization signal Vinit(X+1). An output signal of a preceding stage is supplied as an input signal to both the charge pump and the initialization device of the subsequent stage. For example, the output signal Vout1 at an output node SN1 of the Stage 1 is supplied as the input signal Vin2 for both the charge pump CP2 and the initialization device INIT2 of the subsequent Stage 2, the output signal Vout2 at an output node SN2 of the Stage 2 is supplied as an input signal for both the charge pump and the initialization device of a subsequent Stage 3 (not shown), and the output signal of a Stage X (not shown) is supplied as the input signal Vin(X+1) for both the charge pump CP(X+1) and the initialization device INIT(X+1) of the subsequent Stage (X+1) which outputs, at an output node SN(X+1), an output signal Vout(X+1) to a subsequent stage. The output signal of each stage is supplied to a corresponding load of the stage.

In at least one embodiment, each of the initialization devices corresponds to the initialization device 200 or the initialization device 400 as described herein, each of the charge pumps corresponds to the charge pump 110 and includes a capacitor Cp as described herein, and each of the output nodes corresponds to the node N1 in the initialization device 200 or the initialization device 400 as described herein. In at least one embodiment, all stages are identically configured, with identically configured charge pumps CP1, Cp2, . . . CP(X+1) and identically configured initialization devices INIT1, INIT2, and INIT(X+1). In at least one embodiment, all stages include core devices only.

In some embodiments, except for the voltage levels, the operation of each initialization devices is similar to the operation of the initialization device 200 as described herein. In an example operation, an input signal Vin swinging in the first power domain between the ground voltage (zero) and VDD is applied to the Stage 1. The Stage 1, after the initialization phase with the enabled initialization device INIT1 and in the pumping operation phase of the charge pump CP1, boosts Vin to Vout1 swinging in the second power domain between VDD and 2VDD. The Stage 2 subsequently boosts Vout1 swinging in the second power domain to Vout2 swinging in a higher, third power domain between 2VDD and 3VDD. The Stage (X+1) subsequently boosts a VoutX (not shown) swinging in the (X+1)th power domain between XVDD and (X+1)VDD to Vout (X+1) swinging in the (X+2)th power domain between (X+1)VDD and (X+2)VDD. As used herein, XVDD means X times VDD, (X+1)VDD means (X+1) times VDD, and so on. Although each stage boosts the signal voltage level by VDD, which is about 0.8-0.9 V for core devices in some embodiments, the multistage arrangement of the integrated circuit 500 permits the input signal to be boosted to a high voltage depending on applications and the number of stages. To address potential EOS concerns, each of the initialization signals is provided in the lower power domain of the corresponding stage. For example, Vinit1 supplied to Stage 1 is provided in the lower power domain of Stage 1, i.e., in the first power domain between GND and VDD, Vinit2 supplied to Stage 2 is provided in the lower power domain of Stage 2, i.e., in the second power domain between VDD and 2VDD, and Vinit(X+1) supplied to Stage (X+1) is provided in the lower power domain of Stage (X+1), i.e., in the (X+1)th power domain between XVDD and (X+1)VDD. The integrated circuit 500 in at least one embodiment provide charge pump circuitry with low power consumption, high speed, and high signal voltage level.

Figure 6:
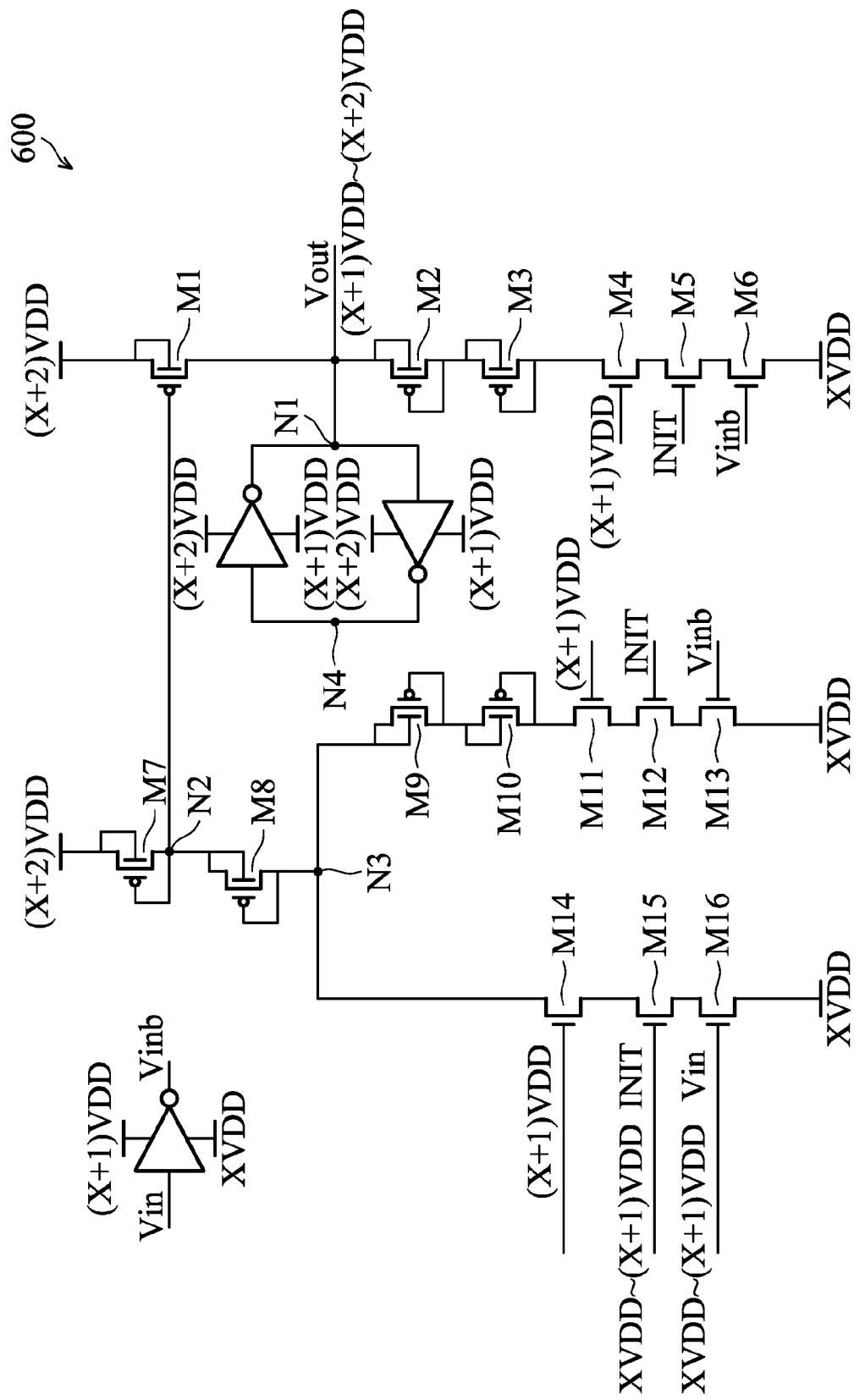
FIGS. 6-8 are circuit diagrams of various charge pump initialization devices, in accordance with some embodiments.
Figure 7:
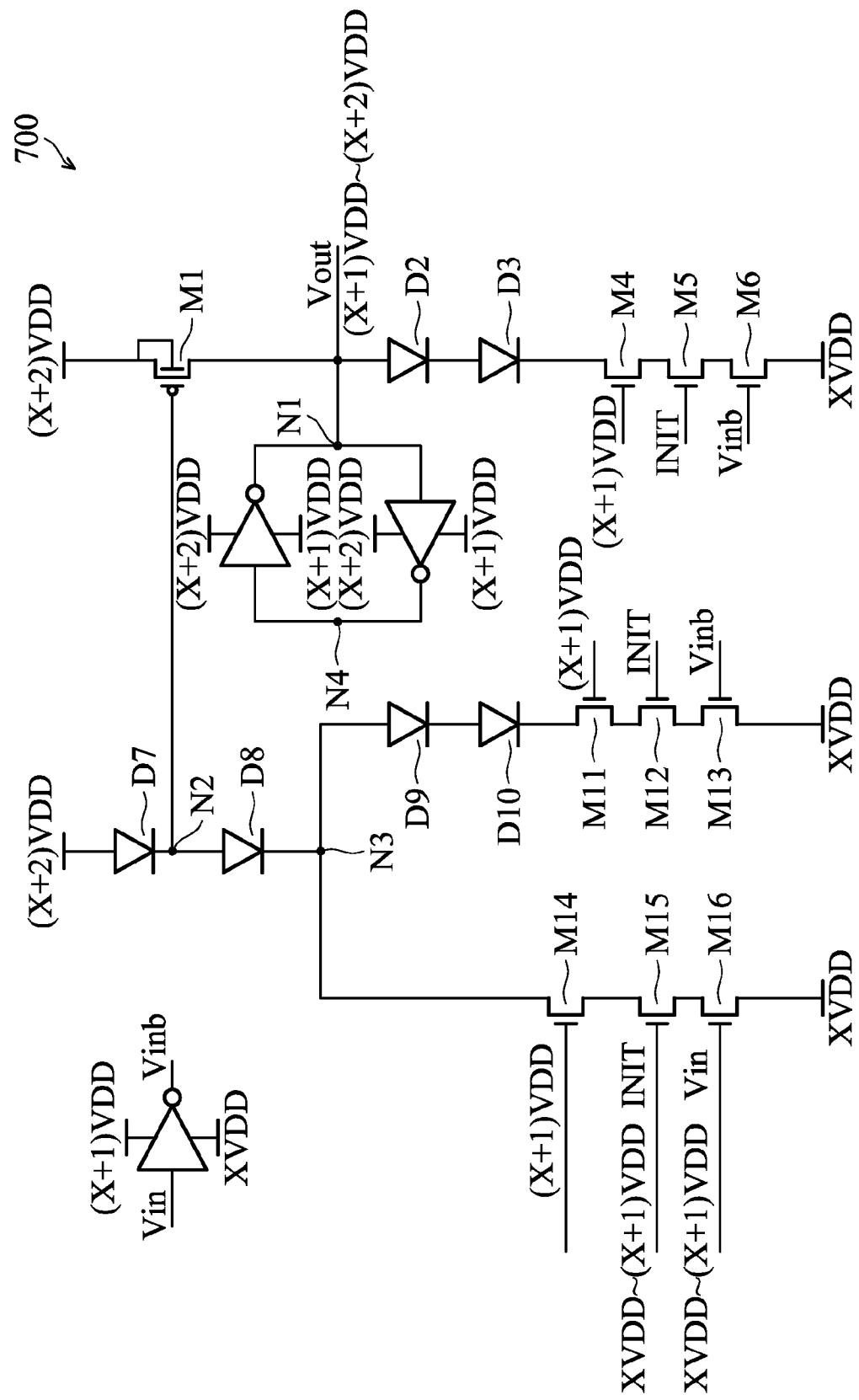
Figure 8:
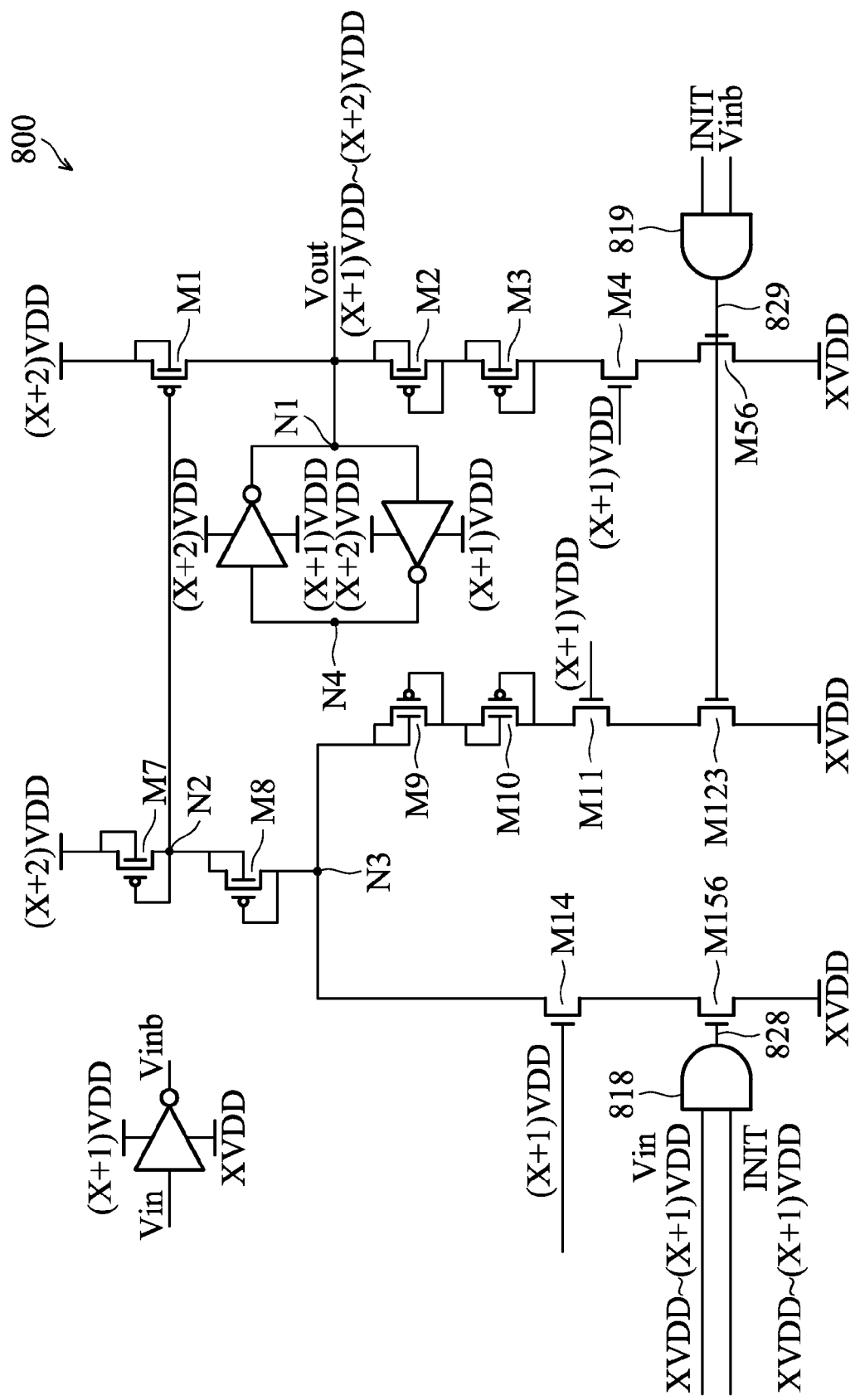

FIGS. 6, 7 and 8 are circuit diagrams of various charge pump initialization devices 600, 700 and 800 in accordance with some embodiments. In at least one embodiment, each of the initialization devices 600, 700 and 800 corresponds to the initialization device INIT(X+1) in FIG. 5. In some embodiments, the configurations of initialization devices 600, 700 and 800 are applicable to the initialization devices in other stages in the multistage charge pump arrangement of FIG. 5 or to a single stage charge pump arrangement.

The initialization device 600 in FIG. 6 is configured and operates similarly to the initialization device 400 of FIG. 4, except that all voltages in the initialization device 600 are higher than the corresponding voltages in the initialization device 400 by XVDD.

The initialization device 700 in FIG. 7 is configured and operates similarly to the initialization device 600 of FIG. 6, except that the diode-connected transistors M2, M3, M7, M8, M9 and M10 of the initialization device 600 are replaced with corresponding diodes D2, D3, D7, D8, D9 and D10 in the initialization device 700.

The initialization device 800 in FIG. 8 is configured and operates similarly to the initialization device 600 of FIG. 6, except that the transistors M5 and M6 are replaced with a transistor M56, the transistors M12 and M13 are replaced with a transistor M123, the transistors M15 and M16 are replaced with a transistor M156, and two AND gates 818, 819 are provided to combine Vinit and Vinb/Vin into control signals for the transistors M56, M123 and M156. The AND gate 818 has two inputs configured to receive Vin and Vinit, and an output coupled to the gate of the transistor M156. The AND gate 818 is configured to generate a control signal 828 turning ON the transistor M156 in response to the first (e.g., high) level of Vin and the presence of Vinit at the corresponding inputs. The AND gate 819 has two inputs configured to receive Vinb and Vinit, and an output coupled to the gates of the transistors M56 and M123. The AND gate 819 is configured to generate a control signal 829 turning ON the transistors M56 and M123 in response to the second (e.g., low) level of Vin and the presence of Vinit at the corresponding inputs. The AND gates are examples. Other logic arrangements for combining Vin and Vinit are within the scope of various embodiments.

Figure 9:
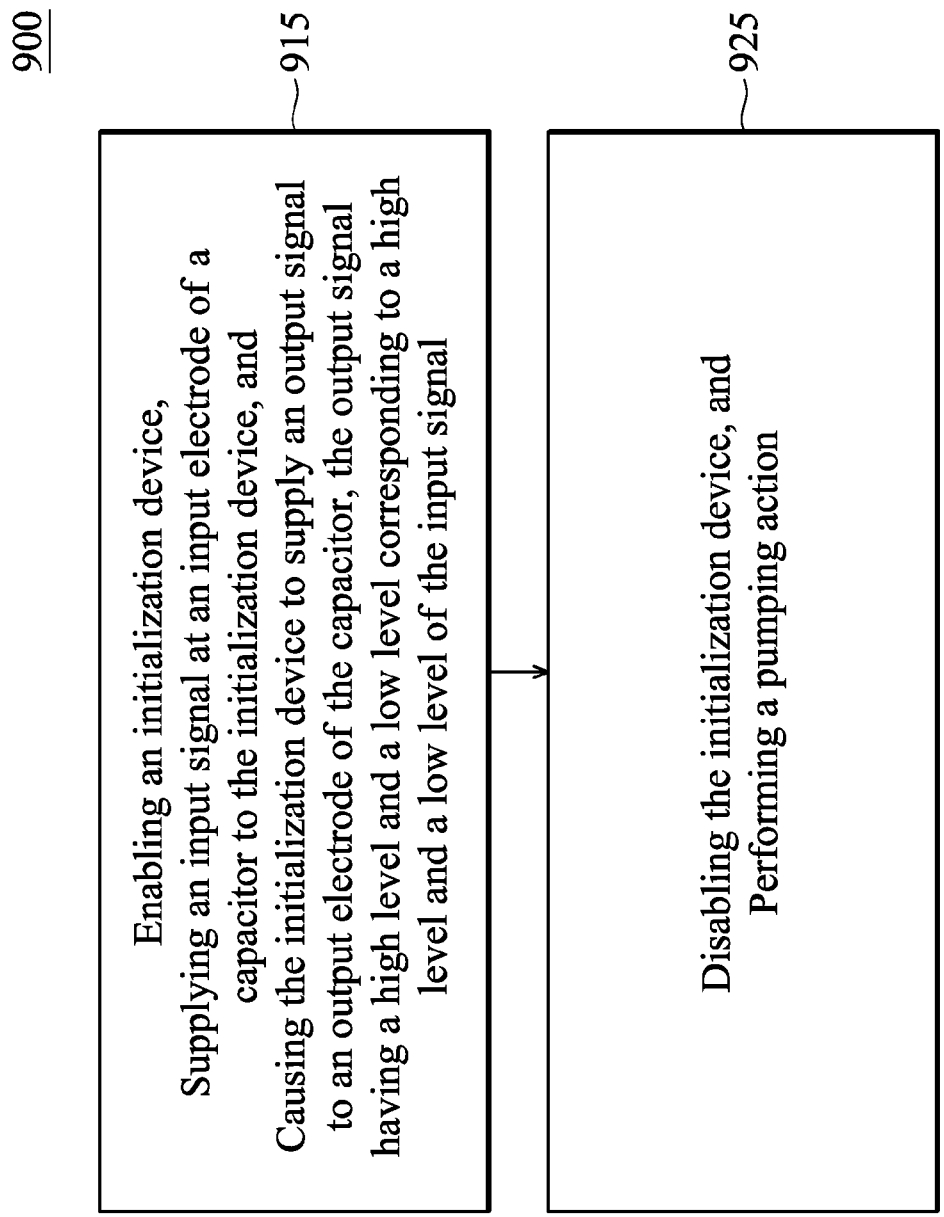
FIG. 9 is a flow chart of a method of operating a charge pump, in accordance with some embodiments.

FIG. 9 is a flow chart of a method 900 of operating a charge pump in accordance with some embodiments. In some embodiments, the method 900 is performed in the integrated circuit 100 as described with respect to FIG. 1.

At operation 915, an initialization phase is performed. In some embodiments, an initialization device is enabled, an input signal supplied to an input electrode of a charge pump capacitor is also supplied to the initialization device, and the initialization device supplies an output signal to an output electrode of the capacitor corresponding to levels of the input signal. For example, as described with respect to FIG. 1, the initialization device 130 is enabled by an initialization signal Vinit, and receives an input signal Vin supplied to an input electrode 112 of a capacitor Cp. Depending on a low or high level of Vin, the initialization device 130 supplies an output signal Vout of a corresponding low or high level to an output electrode 114 of the capacitor Cp. As a result, an intended initial charge Cp*ΔV is accumulated in the capacitor Cp.

At operation 925, a pumping operation phase is performed. In some embodiments, the initialization device is disable, and a pumping action is performed. For example, as described with respect to FIG. 1, Vinit is removed and the initialization device 130 is disabled. As a result, the output electrode 114 is left in a floating state, and Vout at the output electrode 114 follows Vin at the input electrode 112 in a pumping action using the intended initial charge Cp*ΔV accumulated in the capacitor Cp.

The above method embodiment shows example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing various embodiments.

Some embodiments provide an initialization device to cause an intended initial charge to be accumulated in a capacitor of a charge pump. The initialization device, in some embodiments, includes a bias voltage circuit and a driving circuit, the bias voltage circuit controlling the driving circuit to supply an output signal to an output electrode of the capacitor in response to an input signal at an input electrode of the capacitor, thereby storing the intended initial charge in the capacitor. In at least one embodiment, by setting an intended, correct initial charge in the capacitor, potential issues, such as EOS and/or insufficient pumping action, associated with incorrect initial charge in the capacitor are avoidable. In at least one embodiment, the initialization device uses only core devices. As a result, a fast, low power-consumption initialization device is obtained. In at least one embodiment, the initialization device is briefly enabled in an initialization phase of the charge pump to set the initial charge in the capacitor. In a subsequent pumping operation phase, the initialization device is disabled to minimize power consumption and standby current. In at least one embodiment, the initial charge is retained after the initialization device is disabled, for example, by latching a voltage level at the output electrode of the capacitor. As a result, proper initialization and/or pumping action is obtained. In at least one embodiment, cascode devices are provided in the initialization device to safeguard against potential EOS issues.

In some embodiments, an initialization device for a charge pump comprises a driving circuit and a bias voltage circuit. The driving circuit is between a first power supply node and a second power supply node. The driving circuit comprises a first node configured to be coupled to an output electrode of a capacitor in the charge pump. The bias voltage circuit is between the first power supply node and the second power supply node. The bias voltage circuit comprises a second node coupled to a control terminal of the driving circuit. In response to a presence of an initialization signal applied to the initialization device, the bias voltage circuit is configured to output a bias voltage to the control terminal of the driving circuit via the second node, the bias voltage having first and second levels corresponding to first and second levels of an input signal applied to an input electrode of the capacitor, and in response to the first and second levels of the bias voltages, the driving circuit is configured to output at the first node an output signal having first and second levels corresponding to the first and second levels of the input signal.

In some embodiments, an integrated circuit comprises a charge pump initialization device. The charge pump initialization device comprises: a first transistor, at least one second transistor, at least one third transistor, at least one fourth transistor, and first through fourth resistance circuits. The first transistor is coupled between a first power supply node and a first node. The first resistance circuit is coupled between the first power supply node and a second node, the second node coupled to a gate of the first transistor. The second resistance circuit is coupled between the second node and a third node. The at least one second transistor is coupled between the third node and a second power supply node. The at least one second transistor is configured to be turned ON in response to a presence of an initialization signal and a first level of an input signal. The third resistance circuit and the at least one third transistor are coupled in series between the third node and the second power supply node. The at least one third transistor is configured to be turned ON in response to the presence of the initialization signal and a second level of the input signal. The fourth resistance circuit and the at least one fourth transistor are coupled in series between the first node and the second power supply node. The at least one fourth transistor is configured to be turned ON in response to the presence of the initialization signal and the second level of the input signal In some embodiments, a method of operating a charge pump comprises an initialization phase and a pumping operation phase. In the initialization phase, an input signal is supplied to an input electrode of a capacitor of the charge pump and to an initialization device of the charge pump. An initialization signal is supplied to the initialization device of the charge pump. The initialization device supplies an output signal to an output electrode of the capacitor. The output signal has a high level and a low level corresponding to a high level and a low level of the input signal, the input signal and the output signal causing a charge to be accumulated in the capacitor. In the pumping operation phase following the initialization phase, the initialization signal is removed from the initialization device to place the output electrode of the capacitor in a floating state, and a pumping action is performed with the charge accumulated in the capacitor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An initialization device for a charge pump, the initialization device comprising:
a driving circuit between a first power supply node and a second power supply node, the driving circuit comprising a first node configured to be coupled to an output electrode of a capacitor in the charge pump; and
a bias voltage circuit between the first power supply node and the second power supply node, the bias voltage circuit comprising a second node coupled to a control terminal of the driving circuit, wherein
in response to a presence of an initialization signal applied to the initialization device,
the bias voltage circuit is configured to output a bias voltage to the control terminal of the driving circuit via the second node, the bias voltage having first and second levels corresponding to first and second levels of an input signal applied to an input electrode of the capacitor, and
in response to the first and second levels of the bias voltage, the driving circuit is configured to output at the first node an output signal having first and second levels corresponding to the first and second levels of the input signal.

2. The initialization device of claim 1, further comprising:
a latching circuit coupled to the first node and configured to latch the output signal at the first node.

3. The initialization device of claim 1, wherein the bias voltage circuit comprises a voltage divider, the voltage divider comprising:
a first branch between the first power supply node and the second node;

a second branch between the second node and the second power supply node; and
a third branch between the second node and the second power supply node, the second branch having a different resistance from the third branch.

4. The initialization device of claim 3, wherein
the second branch comprises at least one first switch configured to electrically connect the second branch to the second power supply node in response to the initialization signal and the first level of the input signal, and
the third branch comprises at least one second switch configured to electrically connect the third branch to the second power supply node in response to the initialization signal and the second level of the input signal.

5. The initialization device of claim 4, wherein the driving circuit comprises at least one third switch configured to electrically connect the driving circuit to the second power supply node in response to the initialization signal and the second level of the input signal.

6. The initialization device of claim 4, further comprising:
at least one logic circuit configured to combine the initialization signal with the input signal into at least one control signal to turn ON or OFF at least one of the first switch or the second switch.

7. The initialization device of claim 3, wherein
the first branch comprises a first resistance element between the first power supply node and the second node,
the second and third branches have a common, second resistance circuit between the second node and a third node,
the third branch further comprises a third resistance circuit between the third node and the second power supply node, and
the driving circuit comprises a fourth resistance circuit between the first node and the second power supply node.

8. The initialization device of claim 7, wherein at least one of the first resistance circuit, the second resistance circuit, the third resistance circuit or the fourth resistance circuit comprises at least one of a resistor, a diode or a diode-connected transistor.

9. The initialization device of claim 1, wherein, in response to the first level of the bias voltage, the driving circuit is configured to supply a first power supply voltage at the first power supply node to the first node as the first level of the output signal.

10. The initialization device of claim 1, wherein, in response to the second level of the bias voltage, the driving circuit is configured to generate a current in the driving circuit, the current and a resistance of the driving circuit together defining the second level of the output signal at the first node.

11. An integrated circuit, comprising:
a charge pump initialization device, the charge pump initialization device comprising:
a first transistor coupled between a first power supply node and a first node;
a first resistance circuit coupled between the first power supply node and a second node, the second node coupled to a gate of the first transistor;
a second resistance circuit coupled between the second node and a third node;
at least one second transistor coupled between the third node and a second power supply node, the at least one second transistor configured to be turned ON in response to a presence of an initialization signal and a first level of an input signal;

a third resistance circuit and at least one third transistor coupled in series between the third node and the second power supply node, the at least one third transistor configured to be turned ON in response to the presence of the initialization signal and a second level of the input signal; and a fourth resistance circuit and at least one fourth transistor coupled in series between the first node and the second power supply node, the at least one fourth transistor configured to be turned ON in response to the presence of the initialization signal and the second level of the input signal.

12. The integrated circuit of claim 11, wherein the first transistor is configured to:
be turned ON and supply a first power supply voltage at the first power supply node to the first node when the at least one second transistor is turned ON and the at least one third transistor and the at least one fourth transistor are turned OFF, the first power supply voltage defining a first level of an output signal at the first node,
generate a current flowing through the fourth resistance circuit when the at least one second transistor is turned OFF and the at least one third transistor and the at least one fourth transistor are turned ON, the current and the fourth resistance circuit together define a second level of the output signal at the first node, and
be turned OFF when the at least one second transistor, the at least one third transistor and the at least one fourth transistor are turned OFF, the turned-OFF first transistor and the turned-OFF at least one fourth transistor isolating the first node from the first power supply node and the second power supply node.

13. The integrated circuit of claim 11, wherein at least one of the first resistance circuit, the second resistance circuit, the third resistance circuit or the fourth resistance circuit comprises at least one of a resistor, a diode or a diode-connected transistor.

14. The integrated circuit of claim 11, wherein the charge pump initialization device includes only core devices which have the lowest nominal voltage among devices of the integrated circuit.

15. The integrated circuit of claim 11, further comprising:
a first cascode transistor coupled between the at least one second transistor and the third node;
a second cascode transistor coupled between the at least one third transistor and the third node; and
a third cascode transistor coupled between the at least one fourth transistor and the first node,
wherein gates of the first, second and third cascode transistors are configured to receive an average voltage of a first power supply voltage at the first power supply node and a second power supply voltage at the second power supply node.

16. The integrated circuit of claim 11, further comprising:
a charge pump comprising a capacitor, the capacitor having an input electrode configured to receive the input signal, and
an output electrode coupled to the first node.

17. The integrated circuit of claim 16, wherein the charge pump initialization device and the charge pump together define a charge pump stage, the integrated circuit comprising a plurality of said charge pump stages coupled in series.

18. A method of operating a charge pump,
in an initialization phase,
supplying an input signal to an input electrode of a capacitor of the charge pump and to an initialization device of the charge pump;
supplying an initialization signal to the initialization device of the charge pump; and
causing the initialization device to supply an output signal to an output electrode of the capacitor, the output signal having a high level and a low level corresponding to a high level and a low level of the input signal, the input signal and the output signal causing a charge to be accumulated in the capacitor; and
in a pumping operation phase following the initialization phase,
removing the initialization signal from the initialization device to place the output electrode of the capacitor in a floating state, and
performing a pumping action with the charge accumulated in the capacitor.

19. The method of claim 18, further comprising:
latching the output signal during both the initialization phase and the pumping operation phase.

20. The method of claim 18, further comprising:
shutting off all direct current paths through the initialization device upon said removing the initialization signal.

* * * * *